July 8, 1958  R. KIRK  2,842,044
BARBECUE COOKER
Filed July 31, 1957  2 Sheets-Sheet 2
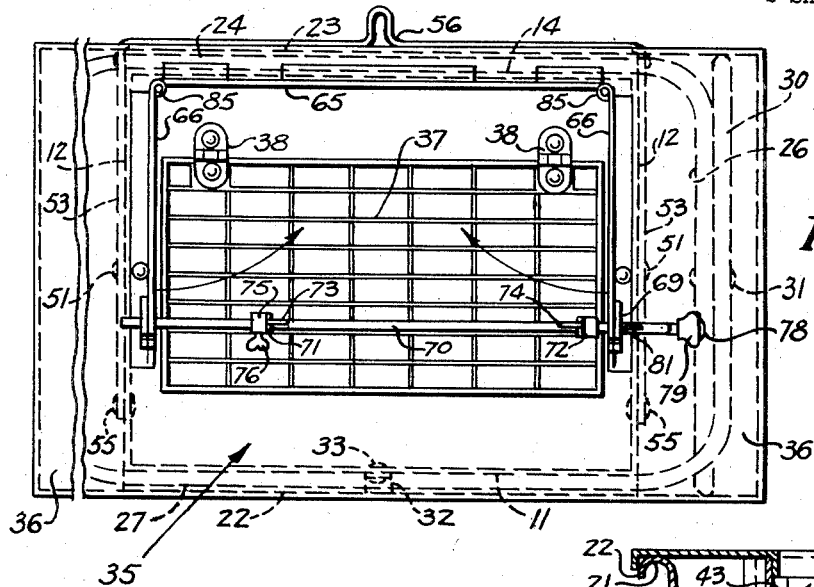
FIG. 3
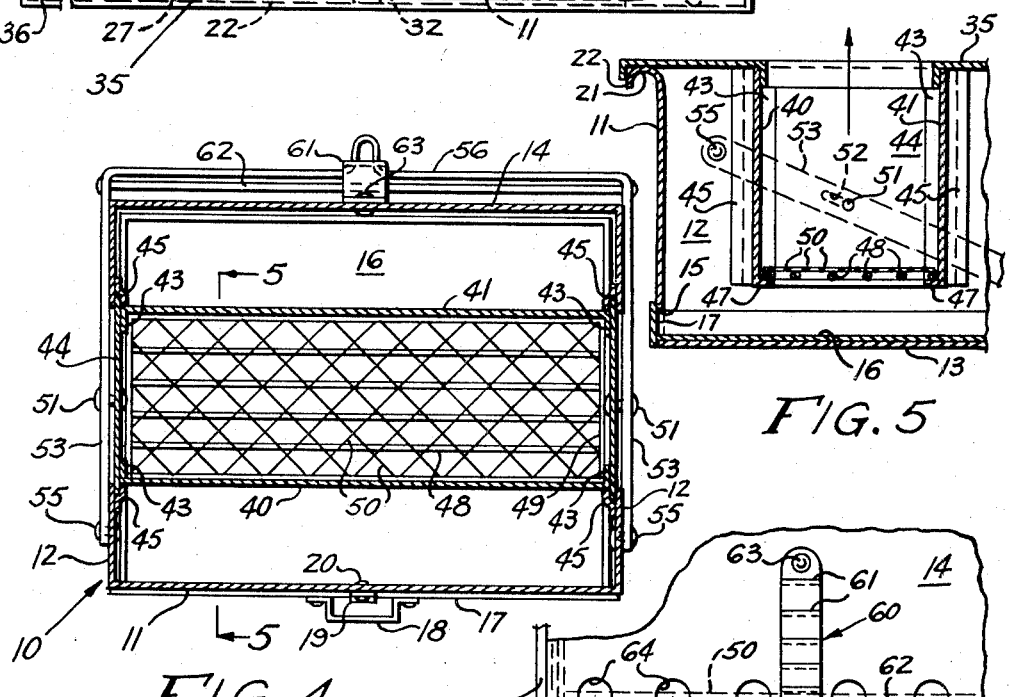
FIG. 4
FIG. 5
FIG. 6
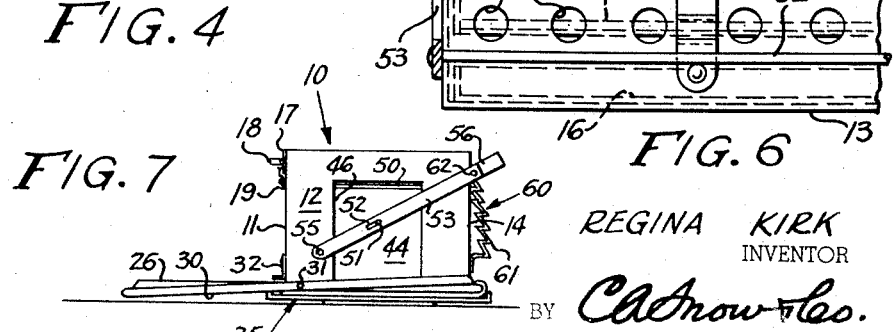
FIG. 7
REGINA KIRK
INVENTOR
BY C. A. Snow & Co.
ATTORNEYS

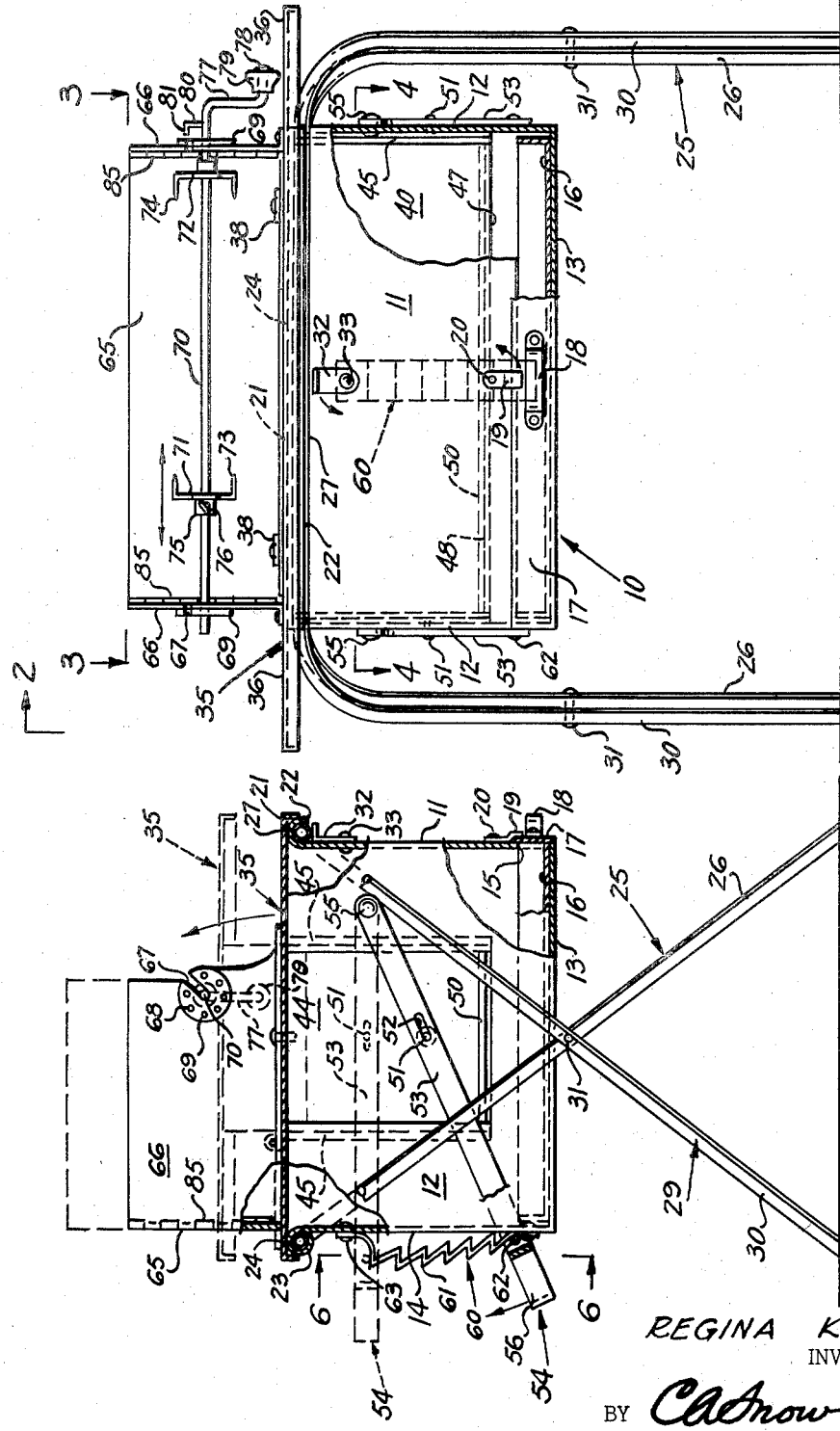

United States Patent Office 2,842,044
Patented July 8, 1958

2,842,044

BARBECUE COOKER

Regina Kirk, Tampa, Fla.

Application July 31, 1957, Serial No. 675,413

6 Claims. (Cl. 99—339)

This invention relates to a barbecue cooker, and more particularly to a portable cooker of this type for the outdoor cooking of barbecued meats, the grilling of steaks, or similar cooking.

A primary object of this invention is the provision of an improved portable barbecue cooker of this character, which is provided with means for raising or lowering the top, which carries a grill thereon relative to the interior of the cooker, to provide a varying draft, and consequent varying heat from the fire within the body of the cooker.

An additional object of the invention is the provision of a device of this character provided with a hinged grill, whereby ready access may be had to the fire box interiorly of the cooker.

A further object of this invention resides in the provision of improved latch means for retaining the top at a desired degree of elevation above the cooker.

An additional object of the invention resides in the provision of such a device having readily foldable legs, whereby the transportation of the apparatus from place to place may be facilitated.

An additional object of the invention is the provision of an improved barbecue spit associated with the grill of the device, which may be readily and simply latched to the desired position of adjustment, or which may be rotated manually, or if desired mechanically, in any desired fashion.

Still another object of the invention is the provision of such a device which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 1 is a front elevational view of one form of barbecue cooker embodying features of the instant invention, certain concealed parts thereof being indicated in dotted lines.

Figure 2 is an end elevational view of the device, taken substantially along the line 2—2 of Figure 1, certain concealed parts thereof being indicated in dotted lines, and certain additional parts thereof being broken away and shown in section, in an alternative position of adjustment of the device being further indicated by dotted lines.

Figures 3 is a top plan view of the device of Figure 1, taken substantially along the line 3—3 of Figure 1 as viewed in the direction indicated by the arrows.

Figure 4 is a sectional view taken substantially along the line 4—4 of Figure 1 as viewed in the direction indicated by the arrows.

Figure 5 is a sectional view taken substantially along the line 5—5 of Figure 4 as viewed in the direction indicated by the arrows.

Figure 6 is a fragmentary sectional view taken substantially along the line 6—6 of Figure 2, certain concealed portions of the apparatus being indicated in dotted lines.

Figure 7 is a reduced end elevational view of the apparatus shown in folded position for transportation.

Similar reference characters refer to similar parts throughout the several views of the drawings.

Having reference now to the drawings in detail, the barbecue cooker of the instant invention comprises a receptacle generally indicated at 10, which includes a front wall 11, side walls 12, a bottom wall 13, and a rear wall 14. The bottom wall is provided adjacent its base with a transversely extending slot 15, through which is slidable an ash drawer, 16, which includes a front plate 17, having a handle 18 thereon, and which provides a means for the ready removal and disposal of ashes. A latch member 19, pivoted as by a pivot 20 to the front wall 11 serves to retain the ash drawer in position within the receptacle.

The top of the front wall 11, is provided, as best shown in Figure 5 with an outwardly extending flange 21, from which depends a second flange 22 and parallel with the side wall 12. The other of side walls 12 is provided, as best shown in Figure 2 with a reverted looped portion 23. The looped portion 23 has fixedly positioned therein the bight 24 of a U shaped member, generally indicated at 25, which includes depending supporting legs 26, the arrangement being such that the portion 24 is free to pivot or swing within the reverted portion 23.

The flanges 21 and 22 serve as a seat for the bight 27 of a second U-shaped supporting member generally indicated at 29, which includes a pair of oppositely disposed legs 30. The legs 30 are secured pivotally to the adjacent legs 26 on opposite sides, of the receptacle 10, as by means of pivots 31, positioned below the bottom 13 of receptacle 10. A pivoted latch 32 is pivotally mounted as on a pivot 33 on the front wall 11, and serves to retain bight 27 in juxtaposed position to the flanges 21 and 22, to hold the legs in the extended position disclosed in Figures 1 and 2.

The receptacle or fire box 10 is also provided with a top generally indicated at 35, of a width conforming to the width of the receptacle 10, but having ends 36 which project outwardly beyond the U-shaped legs 26 and 30 to provide working surfaces, or supporting surfaces for dishes, or foodstuffs, or the like not being cooked. The center of top 35 is provided with an opening, across which extends a grid or grill 37, the latter being hinged as by hinges 38 to open outwardly from the top 35, to provide access to the fire box contained within the receptacle.

The fire box comprises front and rear walls, 40 and 41 respectively, each having inturned flanges, 42 and 43 respectively at their opposite ends, which flanges are secured to side plates 44. The side plates 44 extend transversely beyond the front and rear walls 40 and 41, to provide flanges, which are vertically movable in guides 45, which are interiorly positioned relative to the side walls 12, it being pointed out that each of the side walls 12 is provided with a cutaway portion 46, which extends a substantial portion of the height of such side walls. The bottom of front and rear walls 40 and 41 are also provided with inwardly turned flanges 47 and 48 respectively, which support a grid, which is comprised of transversely extending bars 48, and end bars 49, over which are laid a wire screen or grid 50. The fire, which is normally of charcoal, or the like is adapted to be laid on the grill or grid 50.

Pins 51 are fixed to each of the slidable side plates 44, which in turn are secured at their upper ends to the under surface of top 35, and the pins 51 extend through slots 52 in the arms 53 of a lift member generally indicated at 54. The arms 53 are pivotally connected as by means of pivots 55 to the side walls 12, adjacent the top and front of the receptacle, and forward of the openings 46. The U-shaped members 54 include a bight portion 56, which extends transversely across the rear of receptacle 10, and serves as a handle. Obviously upon raising the handle 56 from the full line position of Figure 2 to the dotted line position thereof, the action of the slot 52 on the pin will cause the plates 44 to lift, and in consequence will lift the top 35 to the dotted line position. Thus a draft is provided over the upper edge of the receptacle 10, for varying the characteristics of the fire on the grid or grill 50 as may be desired.

The rear wall 14 carries a strap 60, which is formed into a series of teeth 61, having relatively flat upper surfaces, which are adapted to be selectively engaged by a transverse rod or bar 62 which extends parallel to the bight 56, the arrangement being such that the bar 62 may be engaged by any one of the teeth 61, for the purpose of holding top 35 in a selected position of raised adjustment relative to the top of receptacle 10. The strap 60 is secured, as best shown in Figure 5 to the rear wall 14 by bolts or rivets 63. A series of spaced draft openings or holes 64 are positioned transversely across rear wall 14, adjacent the bottom thereof, to provide draft beneath the grid 50, and above the ash drawer 16.

The top 35 is provided with a windshield, which includes a rear wall 65, and side walls 66. The opposite side walls 66 are provided with downwardly and inwardly inclined slots 67, in normal parallelism, and disks 68 having corresponding slots are secured to the outside of the end walls 66. Each disk 68 is provided with a plurality of radial equidistantly spaced apertures 69, for a purpose to be more fully described hereinafter. A longitudinally extending spit 70 is positioned in the slots 67, and extends transversely across the space over the top 35 occupied by the grid or grill 37. The spit 70 is provided with a pair of bracket members 71 and 72, between the side walls 66, and each of the brackets is provided with protruding inwardly extending teeth 73 and 74 respectively, for the engagement of the device with an article to be barbecued, to permit rotation thereof. The member 71 is provided with a collar 75, which is slidable on spit 70, and a thumb screw 76 is provided for tightening the same in a selected position, whereby varying sizes of articles of meat or the like may be accommodated on the spit 70.

One end of the spit 70 terminates in a downwardly extending portion 77, which is outwardly turned as at 78 to form a rotating crank handle. A rotatable knob 79 is positioned on the outwardly extending end 78, to facilitate rotation of the spit. A finger 80 is also fixedly secured to the spit 70 at a point outside of the side walls 66, and is provided with an inwardly extending finger 81. The finger 81 is adapted to be engaged selectively in one of the apertures 69, upon lateral sliding movement of the spit, to hold the same against rotation, in any one of a plurality of different positions of adjustment.

From the foregoing the operation of the device should now be readily understandable. When in use the device is assembled in the position as shown in Figures 1 and 2, with the bight 27 of U-shaped supporting leg member 29 engaged inwardly of the flange 22 beneath the flange 21, and the latch 32 moved to the position as shown in Figure 1, for supporting the device in its uppermost position of adjustment. Movement of the handle 56, will arrange the position of the top 35, and the grid 50, to provide the desired quantity of draft to the fire, and also will position the fire box 50 and spit 70 relatively closer to or farther away from the ash drawer 16 as desired. Access to the bottom of the fire box may be provided by means of the hinged grill 37 previously described as positioned on top 35, and the spit 70 may be rotated as may be necessary by means of the crank handle 79.

Ashes may obviously be removed from the device by removal of the drawer 16 from the bottom of the receptacle 10. Latching of the arms 53 is obviously effected by the engagement of the bar 62 of the selected one of teeth 61, so that the height of the top 35 may be suitably adjusted.

When it is desired to transport the device from place to place, the latch 32 is disengaged, and the bight portion 27 of supporting leg member 29 is disengaged from flange 22, and the leg assemblies 25 and 29 folded together about the pivot 31, to the position shown in Figure 7. The wind screen comprised of rear wall 65 and side wall 66 is removable, and the sections are pivoted vertically as indicated at 85 (see Fig. 3) to facilitate folding. The windshield assembly, together with the spit 70, may then be positioned beneath the top 35, and the entire device folded to the position as shown in Figure 7 may be readily transported.

From the foregoing it will now be seen that there is herein provided an improved barbecue grid, which accomplishes all of the objects of this invention, and others including many advantages of great practical utility and commercial importance.

As many embodiments may be made of this inventive concept, and as many modifications may be made in the embodiments herein before shown and described, it is to be understood that all matter herein is to be interpreted merely as illustrative and not in a limiting sense.

I claim:

1. In a barbecue cooker the combination of a receptacle having bottom, front, rear and side walls, said side walls having openings therein, a fire box in said receptacle having front, rear and side walls and an open bottom, a fire supporting grid extending across said bottom, guide flanges on the sides of said openings in the side walls of said receptacle, said side walls of said fire box being vertically movable in said guide flanges, a top for said receptable secured to the top of said fire box, means for raising and lowering said top relative to said receptacle, and legs supporting said receptacle.

2. The structure of claim 1 wherein said top has an opening therein over said fire box and a hinged grill extends across said opening in said top.

3. The structure of claim 1 wherein said legs comprise a pair of U-shaped leg frames, one of said frames having its bight releasably connected to the top of the front of said fire box and the other frame being pivotally connected to the top of the rear wall of said fire box, the legs of said frame being crossed, and each leg of a frame is pivotally connected to the adjacent leg of the other frame.

4. The construction of claim 1 wherein the means for raising and lowering said top comprises a U-shaped lifting handle having the extremities of its legs pivoted to the side walls of said receptacle, said legs having elongated slots therein, and pins secured in the side walls of said fire box extending through said slots whereby lifting of the bight of said handle lifts said side walls of said fire box through said pin and slot connection and hence lifts said top.

5. The structure of claim 4 wherein the rear wall of said receptacle is provided with a toothed strap and said handle is provided with a transverse cross bar selectively engageable with one of said teeth to secure said top at a desired level of elevation.

6. The structure of claim 1 wherein said top is provided with a windshield comprised of side walls and a rear wall and a rotatable spit extending across said grill between said side walls.

References Cited in the file of this patent

UNITED STATES PATENTS

| | | |
|---|---|---|
| 2,556,365 | McKnight | June 12, 1951 |
| 2,638,888 | Molla | May 19, 1953 |
| 2,806,463 | Smith | Sept. 17, 1957 |